H. T. DEININGER, JR  3,554,029
ULTRASONIC TESTING OF WELDS
Filed March 21, 1969

INVENTOR.
HARRY T. DEININGER, JR.
BY
Edward M. Farrell
ATTORNEY

United States Patent Office 3,554,029
Patented Jan. 12, 1971

3,554,029
ULTRASONIC TESTING OF WELDS
Harry T. Deininger, Jr., Willingboro, N.J., assignor to The Budd Company, Philadelphia, Pa., a corporation of Pennsylvania
Filed Mar. 21, 1969, Ser. No. 809,325
Int. Cl. G01n 29/00
U.S. Cl. 73—67.5                                 6 Claims

ABSTRACT OF THE DISCLOSURE

An ultrasonic system for testing the number of acceptable welds in a device includes means for indexing the device and then rotating it for one revolution past an ultrasonic transducer. Signals are transmitted and received by the transducer. The received signals indicative of acceptable welds are counted to determine if any welds are missing or unacceptable.

---

The inspection of solid materials by means of the ultrasonic pulse echo reflection technique is widely known and has been applied in numerous different types of inspection systems. Generally, a suitable electromechanical transducer, such as a piezo electric crystal, is energized by short electrical pulse signals of high frequency. The crystal is made to vibrate to produce mechanical waves of ultrasonic frequency which are passed into the material being inspected.

The echo signals from the material under test are received by the same or different transducers. Various detection, counting, and timing circuits are then employed to evaluate the received signals or echoes. In some cases, a stream of water between the transducer and the object under test is used to minimize the energy lost during transmission of the ultrasonic energy.

Because of the emphasis on safety, it is important that welds in automotive parts and the like be inspected before releasing the part for assembly into an automobile. Due to the relatively large number of parts involved in mass production, the means employed for inspection must be relatively fast, convenient and reliable.

It is an object of this invention to provide an improved system for testing the number of welds made in an item of manufacture.

It is a further object of this invention to provide an improved system for ultrasonically testing the number of acceptable welds made in an item of manufacture having welds disposed at different planes.

Other objects and advantages of the present invention will be apparent and suggest themselves to those skilled in the art, from a reading of the following specification and claims, in conjunction with the accompanying drawings, in which:

Figure 1:
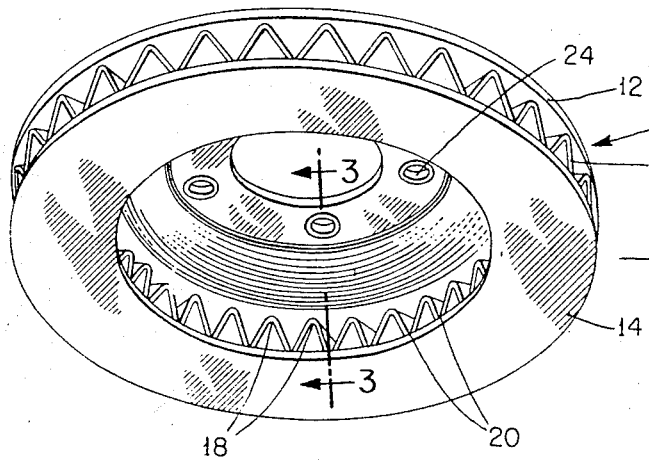
FIG. 1 is a view of a disk brake illustrating a type of article of manufacture which may be tested in accordance with the present invention.
Figure 2:
FIG. 2 is a top view of a disk brake under test in accordance with the present invention.
Figure 3:
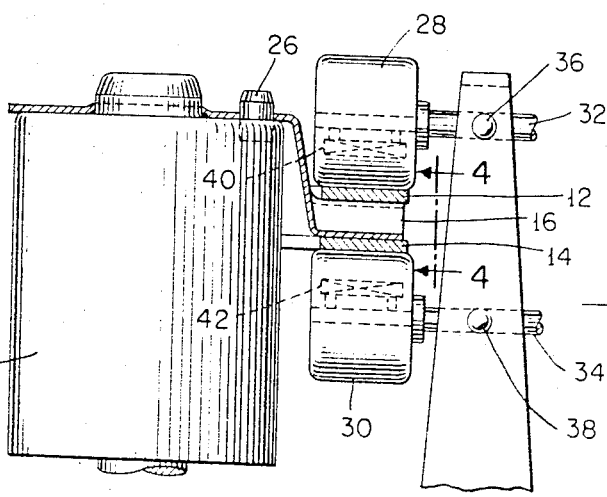
FIG. 3 is a side view of a disk brake under test, partly in cross section, taken along lines 3—3 of FIG. 2.
Figure 4:
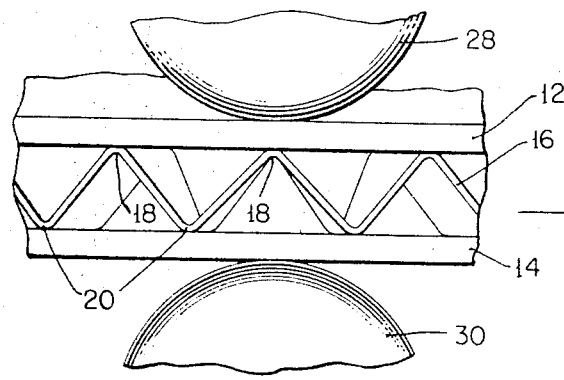
FIG. 4 is a cross sectional view of a disk taken along lines 4—4 of FIG. 3.

Referring to FIGS. 1, 2, 3 and 4 of the drawing, the article of manufacture to be tested, which in this case comprised a disk brake 10, includes a top plate 12 and a bottom plate 14. A corrugated spacer or mounting plate 16 is disposed between the top and bottom plates 12 and 14. The plates 12 and 14 are joined to the corrugated spacer 16 by means of welding. The spacer plate 16 includes top peaks or ridges 18 and bottom peaks or ridges 20. The disk brake 10 is assembled by holding the plates 10 and 12 close to the ridges 18 and 20 and then providing a weld joint at the places of contact. This invention relates to the examination of these weld contacts to determine whether acceptable welds have been made. The corrugated portions of the brake 10 are provided for air ventilation for cooling the brake when it is operated in an automobile.

After the disk has been assembled, and it is desired to test the welds, the brake 10 is placed on a suitable turntable mechanism 22. The disk 10 includes an opening 24 adapted to receive a pin 26 for indexing the disk onto the turntable mechanism 22. The indexing means is provided so that a fixed starting and ending point for one complete revolution of the disk brake 10 may be provided.

After the disk brake 10 has been positioned on the turntable mechanism 22, wheels 28 and 30 are moved into position to physically engage the top and bottom plate members 12 and 14, respectively. The wheels 28 and 30 are pivotally mounted on shafts 32 and 34, respectively, which in turn are adapted to move about pivot points 36 and 38, respectively. Transducers 40 and 42 may be located within the wheels 28 and 30. The transducers are held stationary as the wheels 28 and 30 are rotated. Water may be included in the wheels to minimize energy losses in the transmitted and received signals.

After the brake disk 10 is suitably mounted with the plates 12 and 14 and intermediate portion 16 secured between the wheels 28 and 30, a motor (not illustrated) is actuated to cause the disk to be rotated.

The transducers 40 and 42 may be outset or staggered with respect to each other rather than aligned as illustrated. Normally the on-off operating times of the transducers will be different to prevent the operation of one transducer from interferring with the other.

In testing of solid material by ultrasonic signals, it is known that different characteristics within the materal will cause echo signals of different characteristics to be reflected. It is possible to analyze these signals to determine the nature of the irregularities within the material being tested. Such "flaw" detecting systems are well known. A weld within a material will cause an echo signal of a predetermined characteristic to be reflected. This signal will be generally different than the types of signal reflected from the other parts of the material not including the weld. It has been found that a welded portion within a material will tend to attenuate the transmitted signal. This means that the transmitted signal is partly absorbed by the welded portion of the material and little or no energy is available for reflection. This characteristic may be used to distinguish between acceptable and non-acceptable welds. This condition is illustrated in FIGS. 5a and 5b.

Figure 5A:
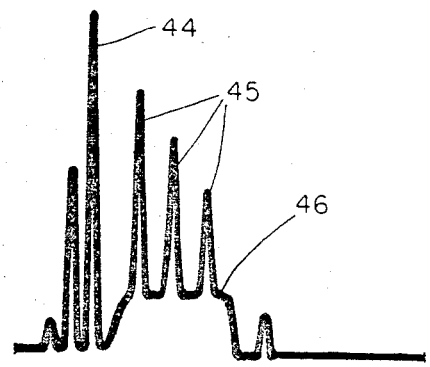
FIGS. 5a and 5b are wave forms illustrating signals representative of an acceptable weld and a non-acceptable weld, in accordance with the present invention.
Figure 5B:
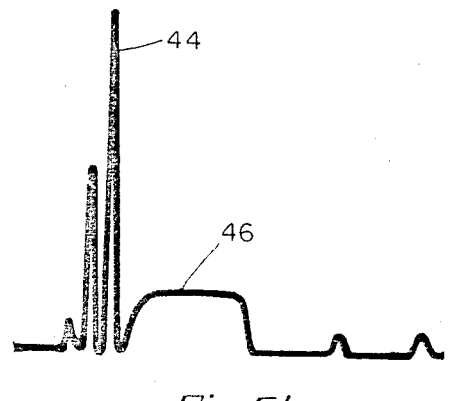

In FIG. 5a, a wave form from an oscilloscope is illustrated. The signals represent signals which are reflected back from a material under test. Relatively high pulse signals 44 transmitted along with other pulse echo or reflected signals 45 of lower amplitude are illustrated. The signals 45 represent reflections from material which do not include a welded portion. Gate signals 46 are also illustrated. These gate signals are generated at predetermined intervals during the time that the signals from a welded portion normally should be reflected. Upon examination of these gating signals, it may be determined whether or not there is a good weld at the part under test dependent upon the presence or absence of the signals 45. In FIG. 5a, it is seen that the high amplitude signal 45 is present at the same time as the gate signal 46. This indicates the absence of a weld in the material being tested. In FIG. 5b, it is noted that at the time of the gate signal 46, there are no high amplitude signals 45 present. This condition indicates that the weld under test is acceptable or a good weld. The gate signals are synchronized with the transmitted pulse signals. The phasing may be varied so that they are generated at the time that signals are reflected from the weld area. Such things are well known.

In the present invention, means are provided for detecting the absence of the high signal 44 during the time of the gating signal 46. The number of times that the high amplitude reflected signals are absent are counted. The total count is then compared with the standard or the total number of acceptable welds which must be present to provide an acceptable part. If the number counted is less than the total welds that should be made, the parts may then be marked for visual inspection at a later time to determine where the unacceptable welds occurred.

Figure 6:
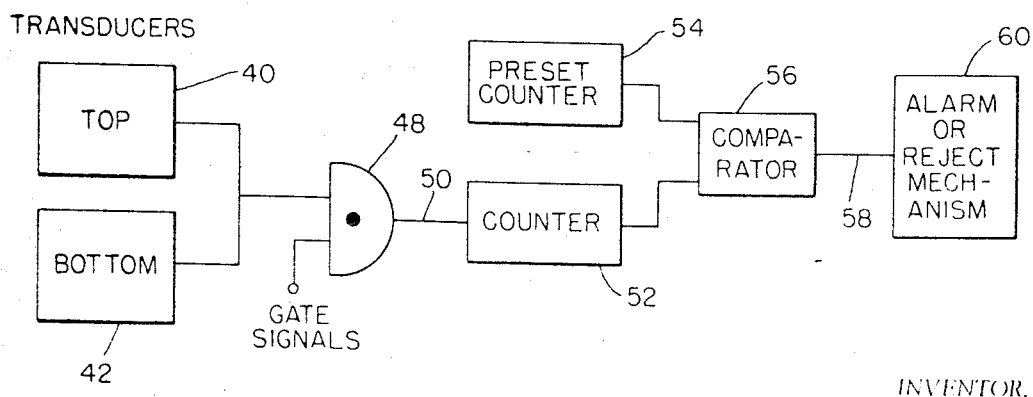
FIG. 6 is a block diagram illustrating part of an overall system for testing welds by ultrasonic signals, in accordance with the present invention.

Referring particularly to FIG. 6, the ultrasonic signals received from the disk brake 10 by the top and bottom transducers 40 and 42 are applied to an AND gate circuit 48 which combines the signals from the transducers. Inverter circuits or threshold control circuits may sometimes be included between the transducers and the AND gate.

The circuit 48 may comprise a gating circuit to which gating signals are applied along with the signals from the transducers. The gating circuit 48 produces outward signals at the line 50 whenever the gate signals are applied to the AND gate 48 and the signals from the transducers do not include high amplitude pulse signals, such as the signals 45. Production of these output signals at the line 50 indicates that an acceptable weld is present in the material being tested.

The output signals from the gate circuit 48 is applied from the line 50 to a counter 52. The counter 52 will count for each signal received representative of an acceptable weld. The number of welds counted for one revolution of the disk brake is compared with the total number of acceptable welds which should have been made. This number or standard may be stored in a preset counter 54. The total number of acceptable welds counted by the counter 52 is compared with the number stored in the preset counter by a comparator 56. In the event that the total number of acceptable welds does not pass the predetermined minimum, a signal is developed at the line 58 which, in turn, actuates an alarm circuit 60.

Actuation of the alarm 60 or making device indicates a rejected article. In this case, the article may be visually inspected later and repairs made.

Figure 7:
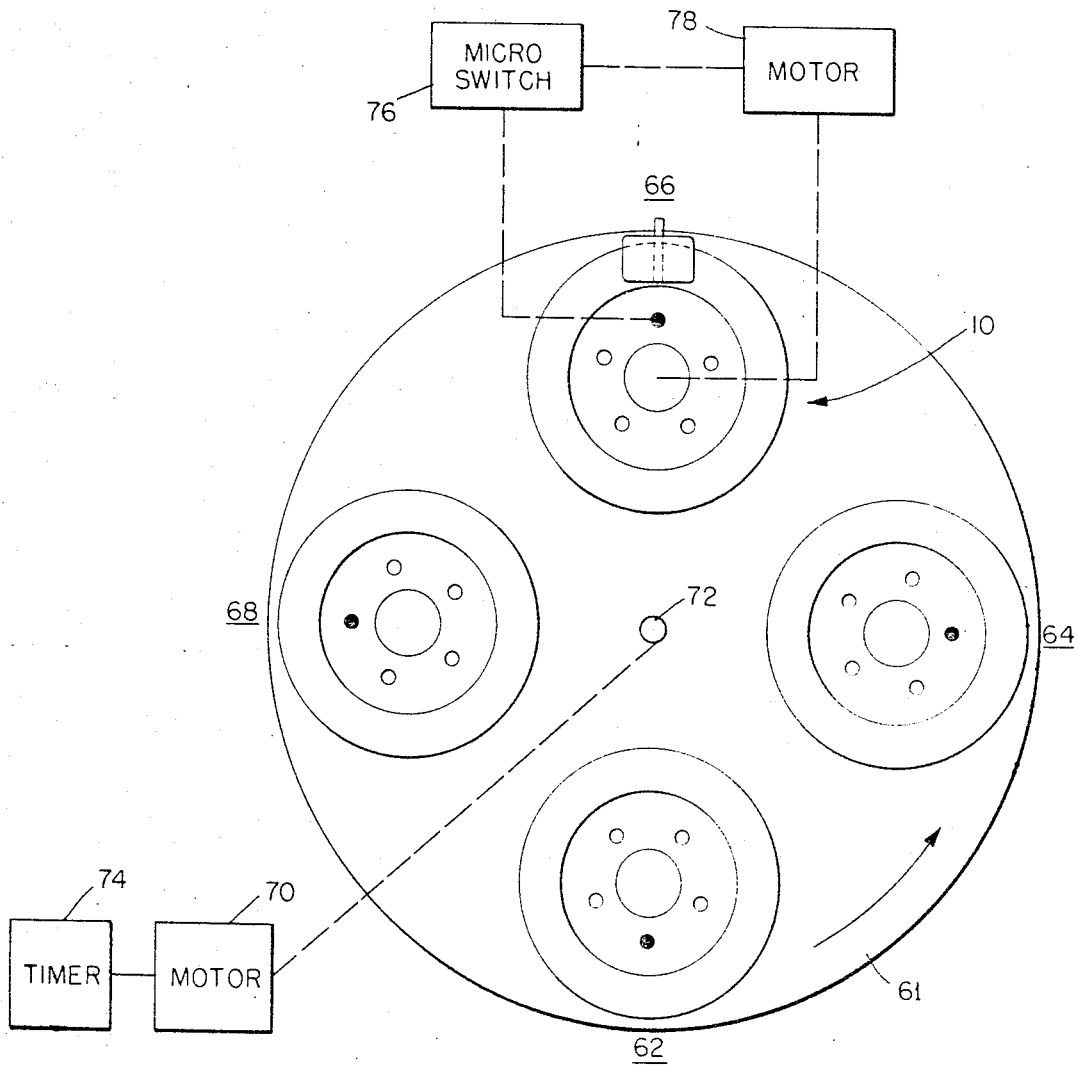
FIG. 7 is a top view illustrating a turntable arrangement, in accordance with the present invention.

Referring particularly to FIG. 7, there is illustrated a system designed for relatively fast inspection on an assembly line basis of a plurality of brake disks. A turntable 61 may include a number of operating positions 62, 64, 66 and 68. An operator may put the brake disk on the turntable in an index position at position 62. The turntable 61 is rotated by means of a motor 70 connected to a shaft 72. A timer or other means 74 is used to actuate tthe motor 70 for a predetermined time which could be equal to ¼ of a revolution of the turntable 61.

The brake disk is moved into position 66 where it is subjected to the ultrasonic testing, such as that previously described. Upon movement of the brake disk into the proper position a microswitch 76 or other means may be actuated to cause a motor 78 to rotate the brake disk 10. At the end of one revolution, means are employed (not illustrated) to open the microswitch 76 thereby making the motor inactive. Upon completion of the testing, the turntable 61 is moved by the motor 70 to position 68. At position 68, an operator may take the brake disk 10 off the turntable to make this position ready to receive another disk to be inserted at position 62.

The present system has provided a relatively fast way for testing items of manufacture, such as brake disks. The items may include a plurality of welds disposed at different planes.

Many details relating to the particular circuitry are not shown or described in detail for purposes of clarity. The various circuitry for counting, comparing, gating and detecting are well known in the ultrasonic testing systems.

What is claimed is:

1. An ultrasonic system for testing for the presence or absence of welds at a plurality of locations in an article of manufacture comprising a transducer for transmitting and receiving ultrasonic signals to the article under test, means for moving said article so that said plurality of locations is sequentially moved in close proximity to said transducer to receive ultrasonic signals therefrom, a counter adapted to be activated by signals of a predetermined characteristic indicative of an acceptable weld, means for applying signals received by said transducer to said counter whereby said counter is actuated each time a signal representative of a good weld is received, said counter recording the total number of acceptable welds in said article under test.

2. The invention as set forth in claim 1 wherein means are provided to rotate said article of manufacture one revolution with said plurality of locations passing in close proximity to said transducer.

3. The invention as set forth in claim 2 wherein means are provided for indexing the start of the revolution of said article under test.

4. The invention as set forth in claim 3 wherein a turntable is provided for receiving a plurality of articles to be tested with means being provided to move one at a time one of said articles in close proximity to said transducer to permit testing of said moved article.

5. The invention as set forth in claim 4 wherein said article of manufacture includes a disk brake having top and bottom plates secured to a corrugated intermediate portion with said plurality of welds being provided to weld said plates to the top and bottom peak portions of said intermediate portion.

6. The invention as set forth in claim 5 wherein a pair of transducers is provided with one disposed adjacent said top plate and the other disposed adjacent said bottom plate to transmit and receive ultrasonic signals to said disk brake under test.

References Cited

UNITED STATES PATENTS

| 2,903,886 | 9/1959 | Renaut | 73—67.2 |
| 3,354,700 | 11/1967 | Schindler | 73—67.9 |
| 3,415,110 | 12/1968 | Cowan | 73—67.8 |
| 3,417,610 | 12/1968 | Nance et al. | 73—67.7 |
| 3,433,058 | 3/1969 | Tobin, Jr., et al. | 73—67.7 |

OTHER REFERENCES

Hughes, et al., "The Evaluation of Bond Quality in Honeycomb Panels Using Ultrasonic Surface Wave Techniques," Nondestructive Testing, vol. 17, No. 6, Nov.-Dec. 1959, pp. 373–377.

LoPilato et al., "Unbond Detection Using Ultrasonic Phase Analysis," Materials Evaluation, December 1966, pp. 690–696.

CHARLES A. RUEHL, Primary Examiner

U.S. Cl. X.R.

73—67.9